July 21, 1959
J. W. WRIGHT
2,895,514
PORTABLE RECIPROCATING POWER SAW
Filed Aug. 19, 1954
6 Sheets-Sheet 1
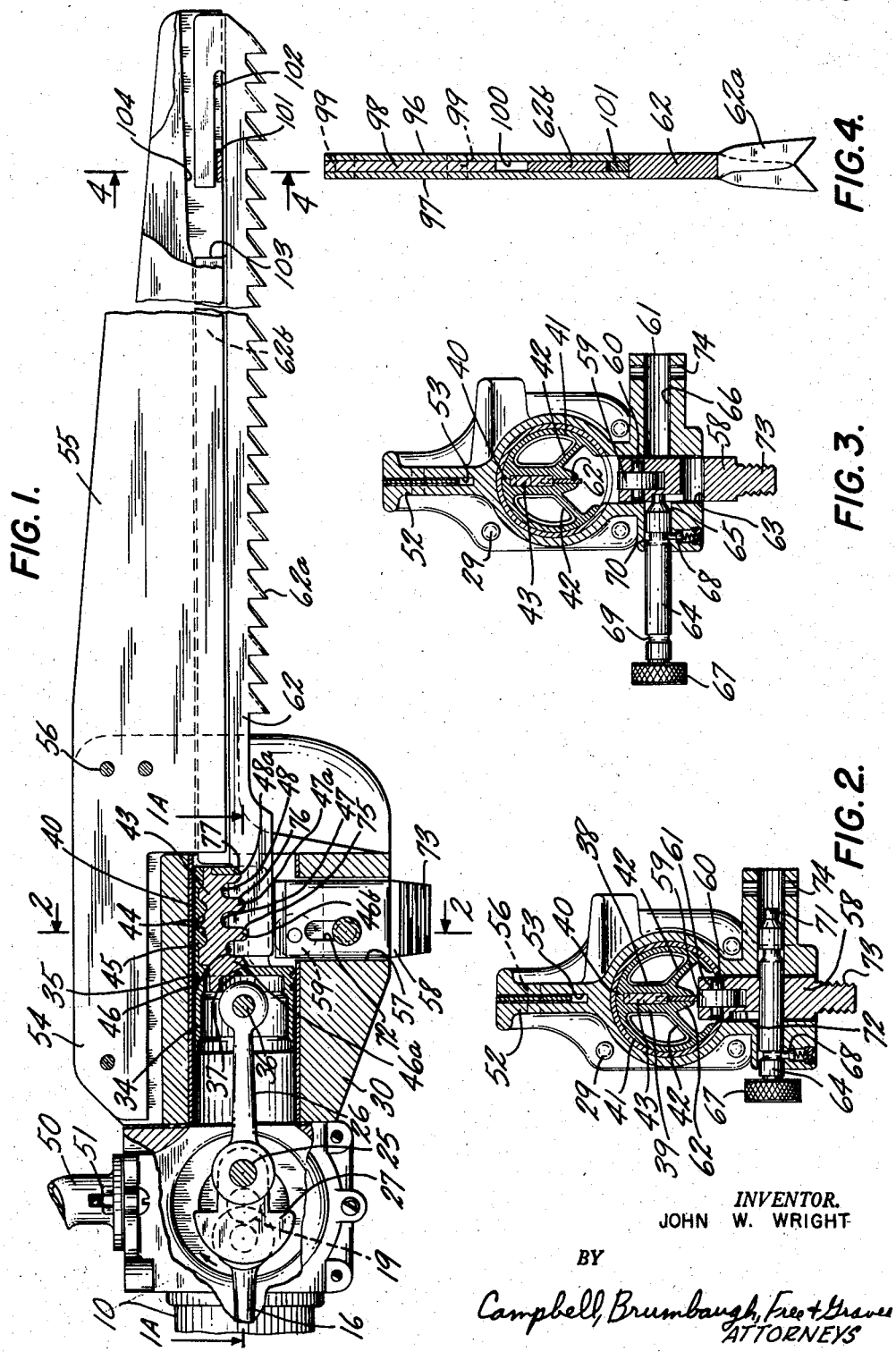
INVENTOR.
JOHN W. WRIGHT
BY
Campbell, Brumbaugh, Free + Graves
ATTORNEYS

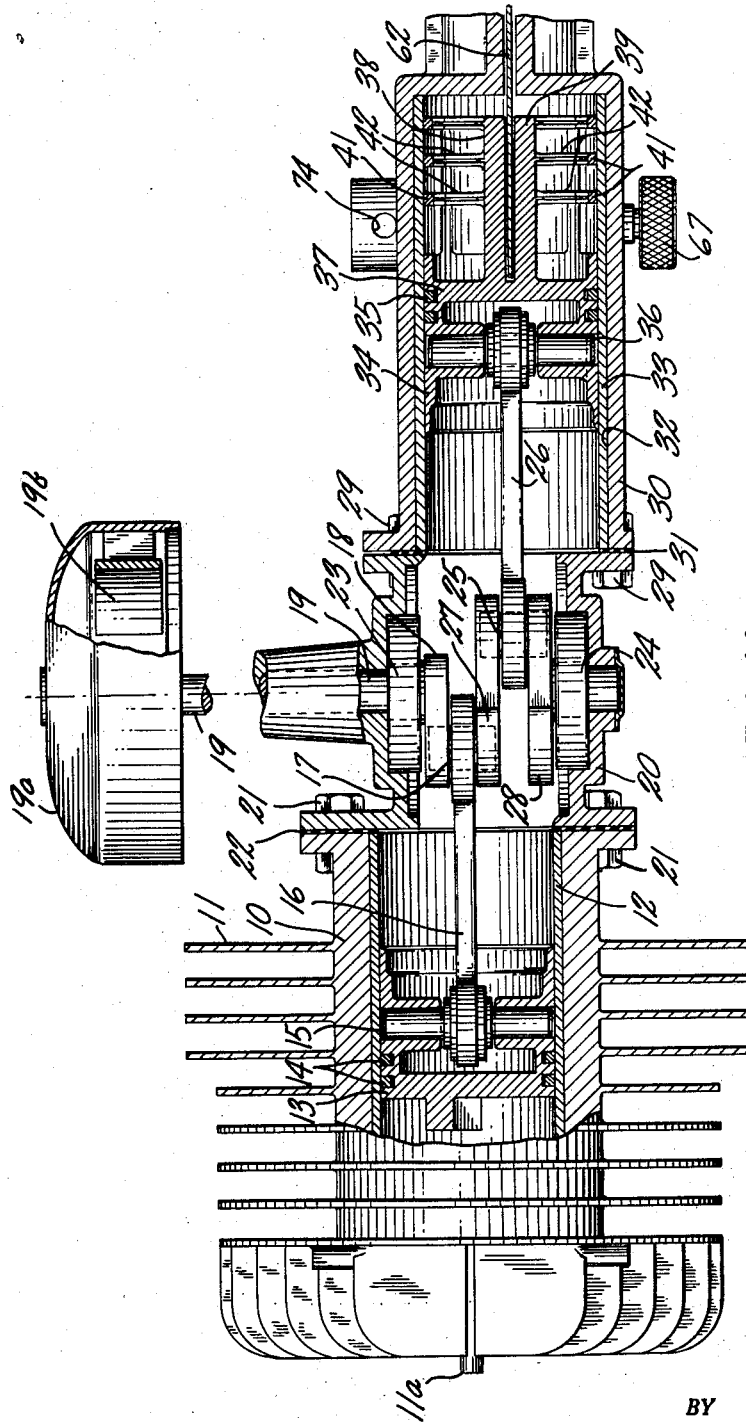
FIG. IA.
INVENTOR.
JOHN W. WRIGHT

July 21, 1959
J. W. WRIGHT
2,895,514
PORTABLE RECIPROCATING POWER SAW
Filed Aug. 19, 1954
6 Sheets-Sheet 3
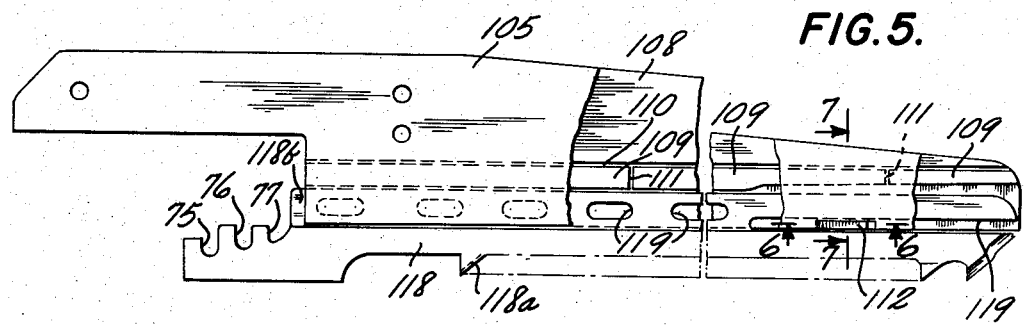
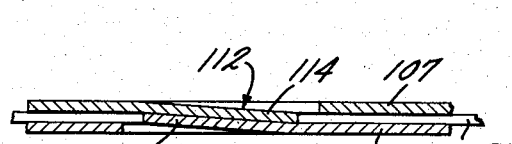
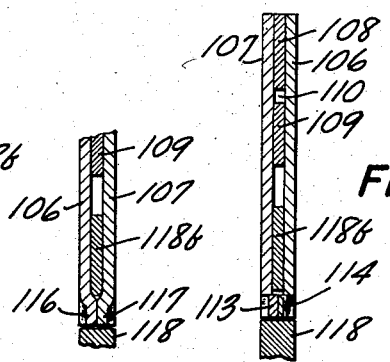
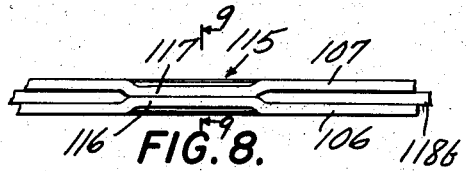
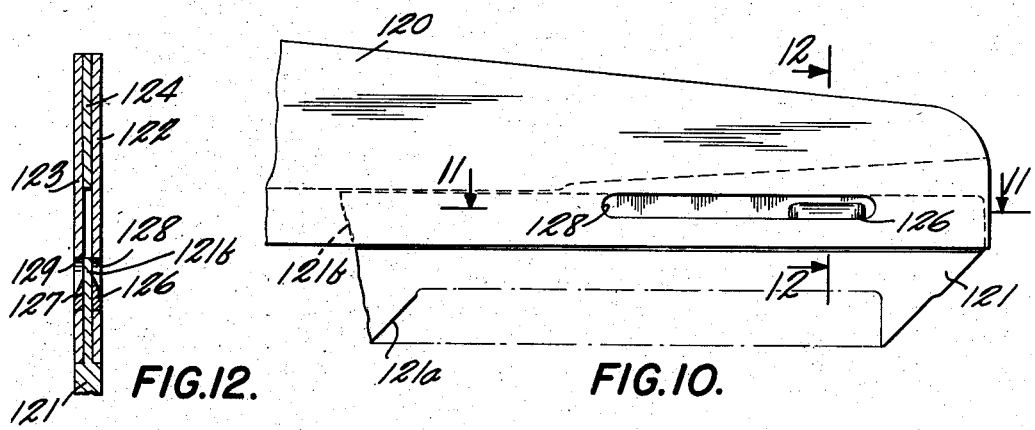
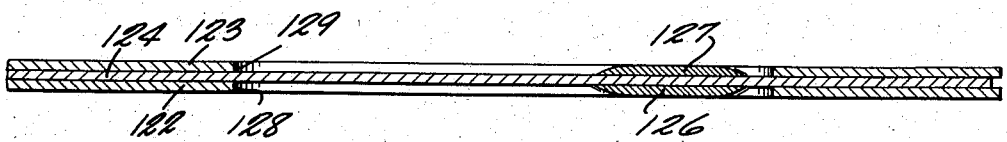
INVENTOR.
JOHN W. WRIGHT
BY
Campbell, Brumbaugh, Free & Graves
ATTORNEYS.

July 21, 1959   J. W. WRIGHT   2,895,514
PORTABLE RECIPROCATING POWER SAW
Filed Aug. 19, 1954   6 Sheets-Sheet 4
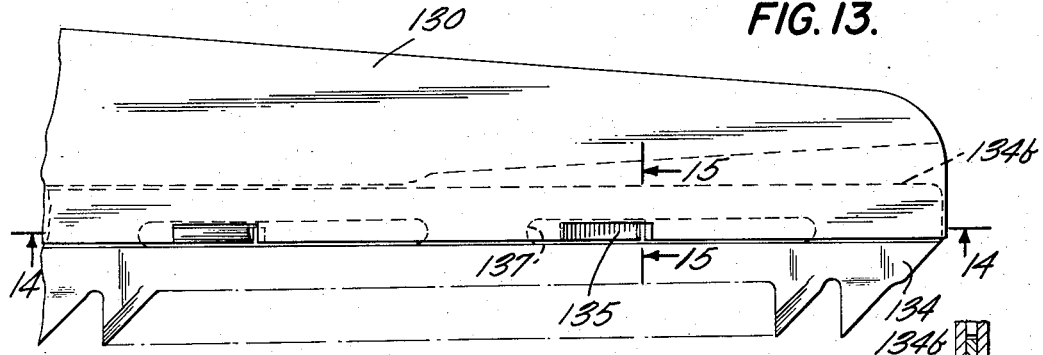
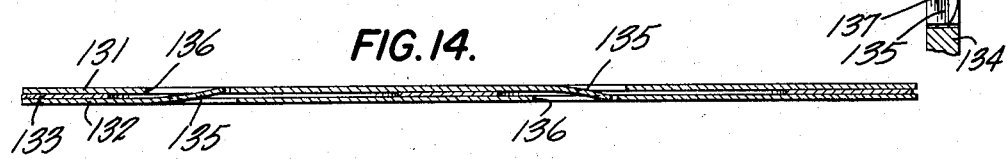
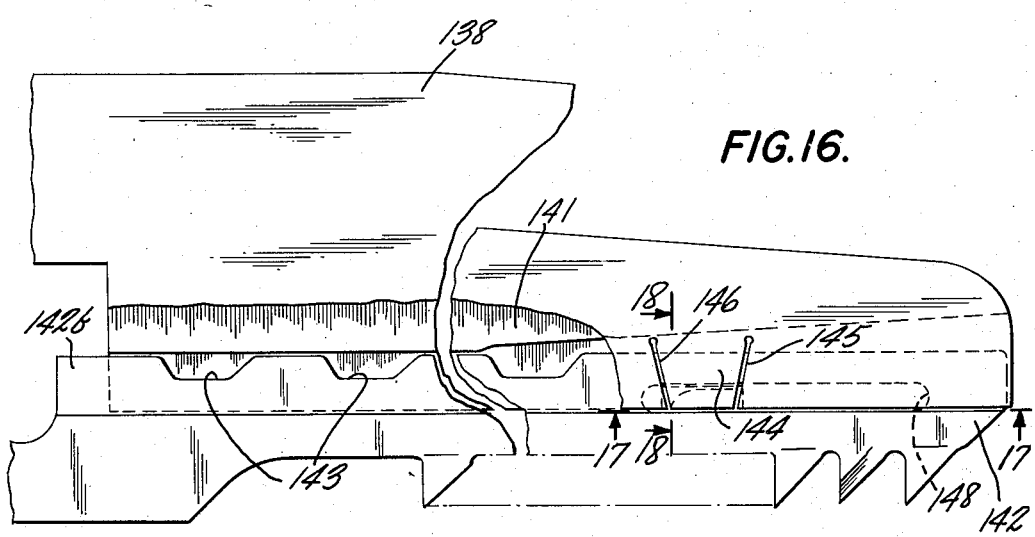
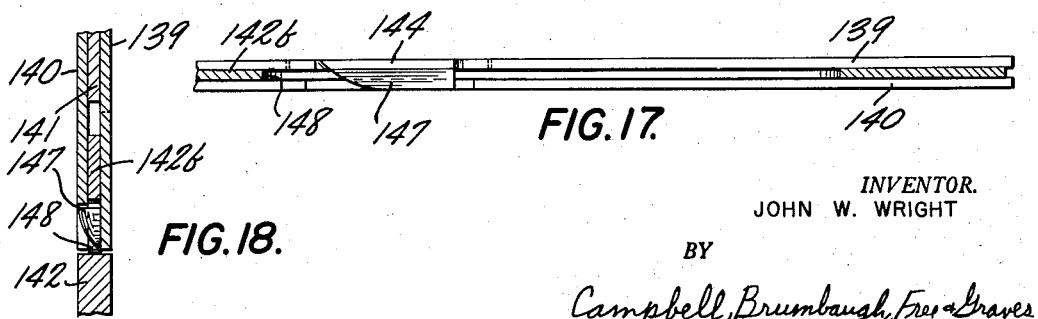
INVENTOR.
JOHN W. WRIGHT
BY
Campbell, Brumbaugh, Free & Graves
ATTORNEYS

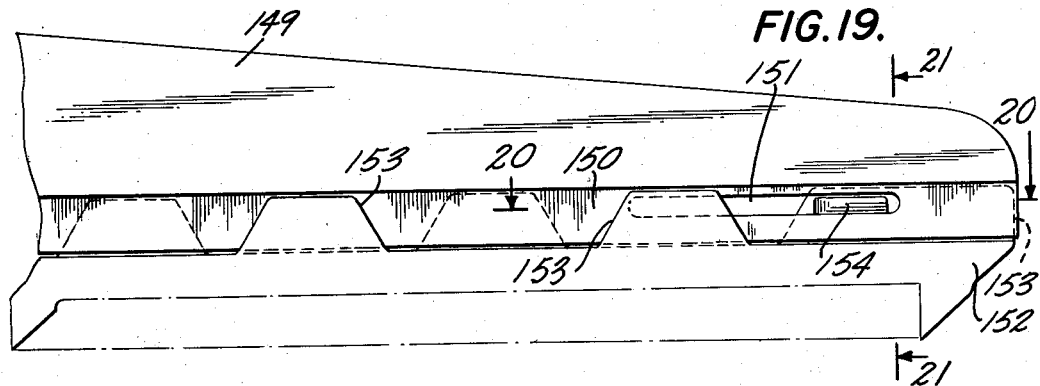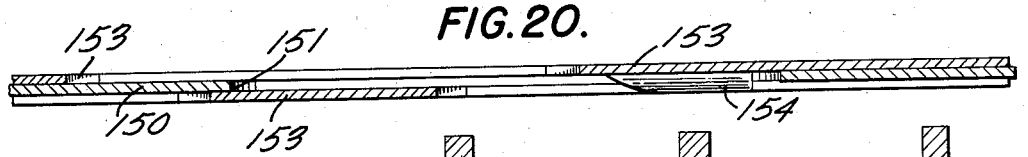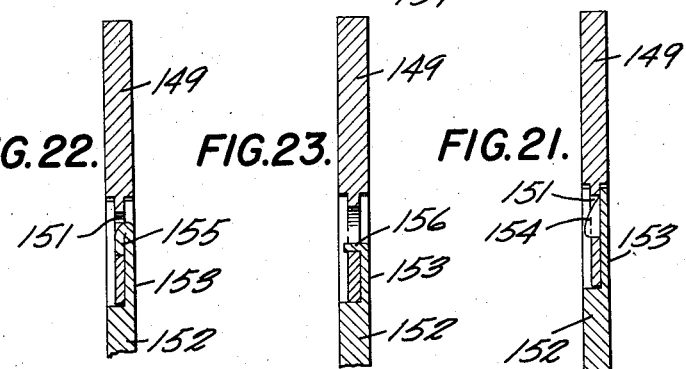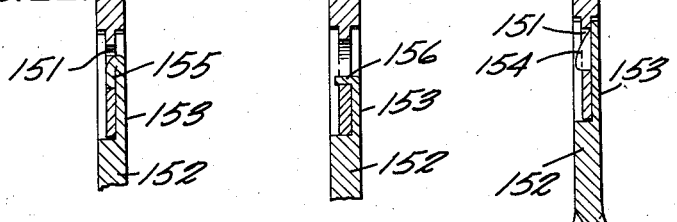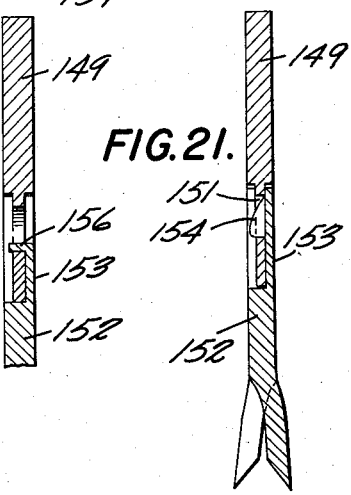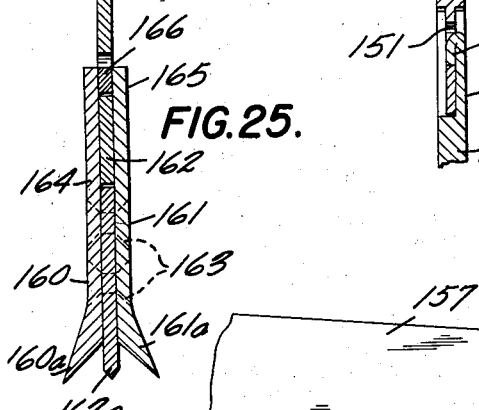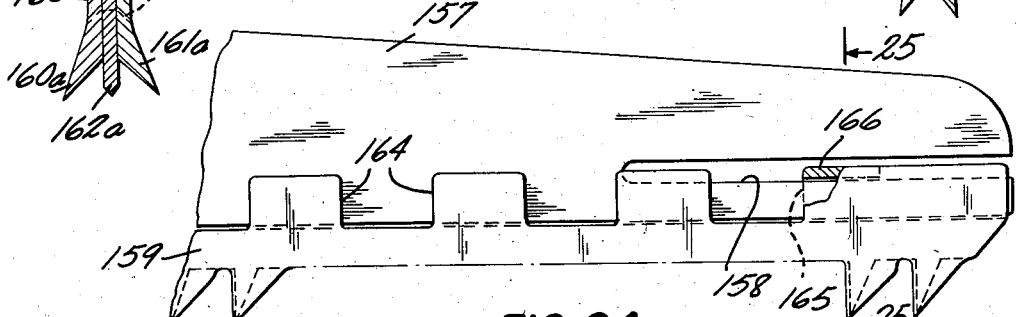

July 21, 1959  J. W. WRIGHT  2,895,514
PORTABLE RECIPROCATING POWER SAW
Filed Aug. 19, 1954  6 Sheets—Sheet 6

INVENTOR.
JOHN W. WRIGHT
BY
Campbell, Brumbaugh, Free & Graves
ATTORNEYS

United States Patent Office 2,895,514
Patented July 21, 1959

2,895,514

PORTABLE RECIPROCATING POWER SAW

John W. Wright, Stratford, Conn.

Application August 19, 1954, Serial No. 450,883

7 Claims. (Cl. 143—68)

This invention relates to power saws and more particularly pertains to a portable power saw employing a guided saw blade.

Portable power saws have suffered various disadvantages in the past, among these being undue bulkiness, erratic operation, complicated and unreliable means for driving the blade, and an inability to rapidly remove and replace a blade that has become dulled or broken. Previously, attempts to remedy these defects have included chain saws with their expensive chains or heavy power saws requiring several operators. Accordingly, it is an object of the present invention to provide a portable power saw overcoming the above deficiencies that employs a guided blade.

It is another object of the invention to provide a power saw driven by an internal combustion engine having a crankshaft directly driving a coupling element connected to a guided saw blade.

It is still another object of the present invention to provide a power saw of the above character in which the saw blade is removably connected to the coupling element.

It is yet another object of the present invention to provide a power saw of the above character in which the saw blade and the guide are keyed together to accommodate the reciprocating motion of the blade.

It is a further object of the present invention to provide a power saw of the above character in which the dynamic relationship of the moving parts of the engine, saw blade, and coupling elements is such that the natural unbalance of these forces is controlled and applied to improve rather than to interfere with the cutting action of the saw blade.

These and further objects of the present invention are accomplished by joining a driving piston and a coupling piston to angularly related cranks on a suitably weighted crankshaft mounted in a crankcase. The coupling piston is slidably mounted in a cylinder communicating with the crankcase and is constructed to removably retain one end of a saw blade.

Extending from a housing adjacent to the coupling piston is a blade guide slidably carrying the saw blade. The saw blade is keyed to the guide to permit reciprocating movement of the blade and to facilitate removal thereof. In one embodiment of the invention, the blade reciprocates in a vertically disposed horizontally extending slot in the guide. In another embodiment of the invention, upwardly extending transversely spaced plates on the blade receive the guide therebetween.

These and further objects and advantages of the present invention will be more readily understood when the following description is read in connection with the accompanying drawings in which:

Figure 1 is a partial elevation, partially broken away, of a power saw constructed in accordance with the present invention;

Figure 1A is a longitudinal section of the power saw illustrated in Figure 1 taken on the view line 1A—1A including a plan view, partially broken away, of an internal combustion engine for driving the saw;

Figure 2 (Sheet 1) is a transverse section of the power saw illustrated in Figure 1 taken on the view line 2—2 looking in the direction of the arrows;

Figure 3 is a section similar to Figure 2 but showing the saw blade locking mechanism in its unlocked position;

Figure 4 is a transverse section, somewhat enlarged, of the saw blade and guide illustrated in Figure 1 taken on the view line 4—4 looking in the direction of the arrows;

Figure 5 (Sheet 3) is an elevation, partially broken away, of a modified guide and saw blade combination for use with the power saw illustrated in Figure 1;

Figure 6 is a longitudinal section, somewhat enlarged, illustrating the key employed in Figure 5 taken on the view line 6—6 looking in the direction of the arrows;

Figure 7 is a transverse section, somewhat enlarged, illustrating the oil channel shown in Figure 5, taken on the view line 7—7 looking in the direction of the arrows;

Figure 8 is a fragmentary bottom view, somewhat enlarged, of a guide and saw blade illustrating another manner in which the key may be formed thereon;

Figure 9 is a transverse section, taken on the view line 9—9 of Figure 8 looking in the direction of the arrows;

Figure 10 is a partial elevation illustrating a further form that may be taken by the guide and saw blade in accordance with the invention;

Figure 11 is a longitudinal section, somewhat enlarged, illustrating the manner of keying the guide and saw blade of Figure 10 taken on the view line 11—11 looking in the direction of the arrows;

Figure 12 is a transverse section, somewhat enlarged, taken on the view line 12—12 looking in the direction of the arrows;

Figure 13 is a partial elevation of still another modified form of guide and saw blade arrangement according to the present invention;

Figure 14 is a longitudinal section, illustrating the manner in which the guide and blade are keyed in Figure 13, taken on the view line 14—14 looking in the direction of the arrows;

Figure 15 is a transverse section, somewhat enlarged, taken on the view line 15—15 of Figure 13 looking in the direction of the arrows;

Figure 16 is a partial elevation of yet a further modified form of guide and blade in accordance with the invention;

Figure 17 is a longitudinal section, showing the manner in which the blade and guide are keyed together in Figure 16, taken on the view line 17—17 looking in the direction of the arrows;

Figure 18 is a transverse section, somewhat enlarged, taken on the view line 18—18 of Figure 16 looking in the direction of the arrows;

Figure 19 illustrates a partial elevation of another modified form of blade and guide combination in accordance with the present invention;

Figure 20 is a longitudinal section, somewhat enlarged, showing the keying arrangement between the blade and guide of Figure 19, taken on the view line 20—20 looking in the direction of the arrows;

Figure 21 is a transverse section taken on the view line 21—21 of Figure 19 looking in the direction of the arrows;

Figure 22 is a transverse section similar to that shown in Figure 21 but illustrating a modified keying arrangement in accordance with the invention.

Figure 23 is another transverse section similar to Figure 21 illustrating a further modified keying arrangement;

Figure 24 is a partial elevation of another modified guide and blade combination in accordance with the present invention;

Figure 25 is a transverse section, somewhat enlarged, taken on the view line 25—25 of Figure 24 looking in the direction of the arrows;

Figure 26:
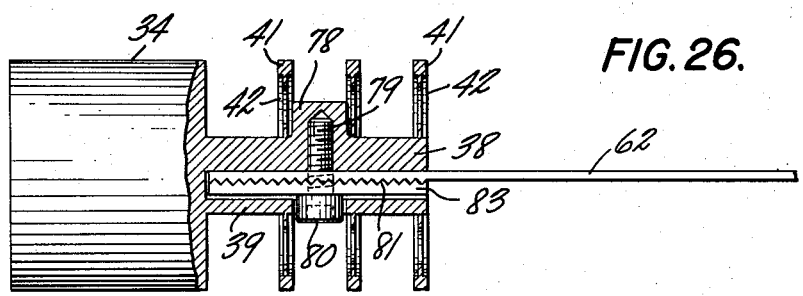
Figure 26 is a plan view, partially broken away, of a modified connection between the drive mechanism and the saw blade.

Referring to an illustrative embodiment of the invention in greater detail with particular reference to Figures 1 and 1A, a cylinder housing 10, provided with cooling fins 11 and a spark plug 11a, carries a cylinder sleeve 12. Mounted in the cylinder sleeve 12 is a piston 13 carrying piston rings 14 and a wrist pin 15. A connecting rod 16 is journaled on the wrist pin 15 and on a crank 17, lightened at 18 for reasons explained below, carried by a crankshaft 19. A flywheel 19a is mounted on the extended portion of the crankshaft 19 and is unbalanced by a weight 19b. The cylinder-piston assembly is fastened to a crankcase 20 by means of nut and bolt assemblies 21, a gasket 22 being provided therebetween. The crankshaft 19 is journaled by bearings 23 and 24 at the ends thereof and carries a further crank 25 journaling a connecting rod 26 thereon. On the crankshaft 19 opposite the crank 25 are found counterweights 27 and 28 dynamically cooperating with the unbalanced flywheel 19a as will be explained hereinafter.

It should be understood that the cylinder-piston assembly is shown for clarity without intake and exhaust ports and is preferably an internal combustion engine of the two-cycle type.

Nut and bolt assemblies 29 join the flanged crankcase 20 to a flanged housing 30, a gasket 31 preferably being provided therebetween. A cylindrical chamber 32 is provided in the housing 30, a hard metal cylindrical sleeve 33 fitting therein and slidably receiving a coupling piston 34 carrying rings 35. Mounted in the piston 34 is a wrist pin 36 carrying the connecting rod 26.

The coupling piston 34 is slidably mounted in the chamber 32 communicating with the crankcase 20. For the internal combustion engine to function, it is apparent that the crankcase 20 must be pressurized, this being conventional practice in two-cycle engines. Therefore, the rings 35 on the piston 34 aid in sealing the cylinder 33. This construction permits the advantageous direct driving arrangement between the crankshaft 19 and the saw blade coupling element, the piston 34.

Examining the construction of the coupling piston 34 in detail with particular reference to Figures 1, 1A, 2 and 3, a forwardly extending blade receiving section is provided to carry the end of a saw blade described in detail hereinafter. The blade receiving section has the same diameter as the piston 34, is open at its lower side, and extends from a head 37 thereof. It includes a pair of vertically disposed parallel plates 38 and 39 formed with a cavity therebetween and extending downwardly from a top portion 40. Three spaced arcuate ribs 41 extend from either side of the portion 40 towards the bottom of the cylinder 33 and are joined by struts 42 to the plates 38 and 39, as clearly shown in Figures 2 and 3.

A hardened insert 43 is disposed in the cavity between the plates 38 and 39 and extends rearwardly through the head 37 and forwardly to be flush with the front edges of the plates 38 and 39. The insert 43 is provided with a pair of recesses 44 on the upper side thereof to receive lugs 45 on the portion 40. Formed in the lower edge of the insert 43 are notches 46, 47 and 48 forming downwardly extending lugs 46a, 46b, 47a and 48a of unequal length for a purpose to be explained hereinafter. The insert 43 may be cast into the recess provided therefor. Alternatively, the forwardly extending portion of the coupling piston 34 may be formed on the insert 43. These are exemplary methods of forming the coupling piston 34 and it will be apparent that it may be constructed in any convenient manner.

Of course, suitable structure (not shown) is secured to the crankcase for supporting the gas supply, ignition elements, etc., for operating the engine formed by the cylinder 10 and the piston 13. Also, an appropriately positioned handle 50 (Figure 1) may be secured to the crankcase 20 by nut and bolt assemblies 51 to permit the saw to be placed and held in an operating position.

The upper portion of the coupling cylinder housing 30 extends somewhat forwardly of the cylinder 32 to form a guide supporting section 52 (Figures 2 and 3). A longitudinally extending slot 53 is provided in the section 52 to receive a rearwardly extending portion 54 of a blade guide 55 extending forwardly from the housing 30. Bolts or rivets 56 may be utilized to secure the portion 54 of the blade guide 55 in the slot 53.

A slot 57 extends downwardly from the forward lower side of the cylinder 32 in the housing 30 and slidably receives a generally rectangular locking bar 58. A bearing wheel 59, journaled on a pin 60 in a slot 61 in the locking bar 58, is mounted to extend above the upper surface of the bar 58 for supporting the lower edge of a saw blade 62. If desired, a solid bearing may be substituted for the bearing wheel 59. A transverse opening 63 in the member 58 cooperates with a pin 64 slidably carried by channels 65 and 66 communicating with the slot 57. The pin 64 carries a knurled head 67 facilitating its movement from the closed position shown in Figure 2 to the open position illustrated in Figure 3. In its closed position, the pin 64 extends through the opening 63 to lock the bar 58 in place with the bearing wheel 59 abutting the blade 62. A spring loaded latching pin 68 urged transversely of the pin 64 fits into an annular recess 69 in the pin 64 to aid in holding it in the closed position. The pin is held in its open position by reason of the latching pin 68 being received in a further annular recess 70. It should be noted that the further side of the recess 70 is vertical to preclude the removal of the pin 64 from the channel 65.

A portion 71 of reduced diameter is formed on the end of the pin 64 and cooperates with a vertical recess 72 extending from the opening 63 to permit the locking bar 58 to travel to its open position shown in Figure 3. Serrations 73 on the lower portion of the bar 58 permit it to be easily grasped and operated.

A vertical opening 74 extending through the end of the channel 66 is adapted to receive a bolt for mounting the other end of the tubular handle 50 (Figure 1).

The saw blade 62 is provided with teeth 62a on its lower edge, the rear upper edge being cut away to form notches 75, 76 and 77 which receive the lugs 46b, 47a and 48a, respectively. It will be apparent that due to the different length and width of the lugs 46b, 47a and 48a and the configurations of the respective notches 75, 76 and 77, it would not be possible to improperly insert the blade 62 into the coupling piston 34.

It will be evident that after the blade 62 has been positioned in the coupling piston 34, the locking bar 58 may be urged upwardly to place the bearing wheel 59 in engagement with the lower edge of the blade 62 and retain it in the piston 34. The pin 64 is subsequently pressed through the channel 65, the opening 63 and the channel 66 to lock the bar 58, the latching pin engaging the recess 69 to positively position the pin 64, as shown in Figure 2.

Figure 27:
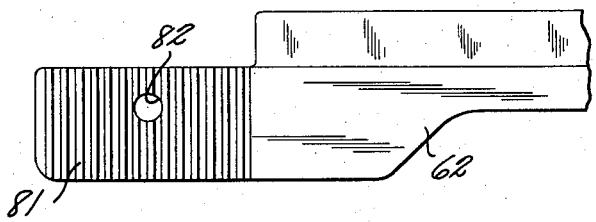
Figure 27 illustrates the end of the saw blade that is utilized in the connection shown in Figure 26.

Referring to Figures 26 and 27, another structure permitting the positive engagement of the saw blade 62 and the coupling piston 34 is illustrated. The blade receiving section is similar to that shown in Figures 1 to 3 being provided with arcuate ribs 41 and struts 42. A somewhat wider longitudinal recess is provided between the plates 38 and 39, a boss 78 being formed on the plate 38. A threaded hole 79 extends through the plate 38 into the boss 78 and is adapted to receive a bolt 80. Formed on one face of the blade 62 are vertical serrations 81 and an opening 82 therethrough. To secure the blade 62 to the piston 34 in this instance, a vertically serrated plate 83 is mounted on the bolt 80 between the plates 38 and 39 and after aligning the opening 82 in the blade 62 with the hole 79, the bolt may be tightened so that the serrated plate 83 engages the serrations 81 to firmly secure the blade 62 to the piston 34.

Figure 28:
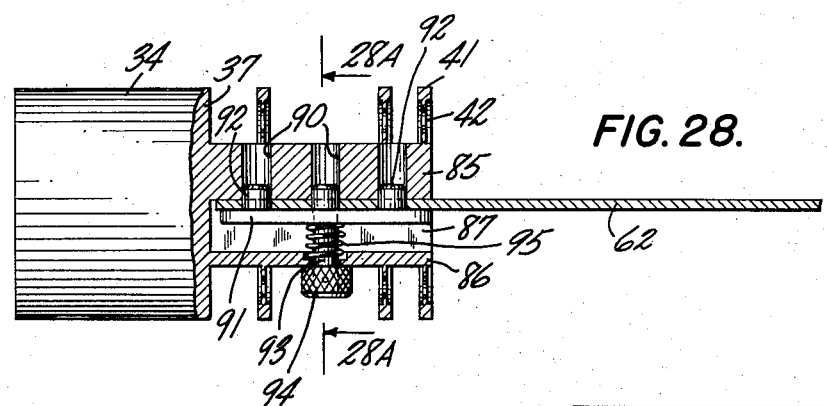
Figure 28 is a plan view, partially broken away, of a further modified connection between the drive mechanism and the saw blade.
Figure 29:
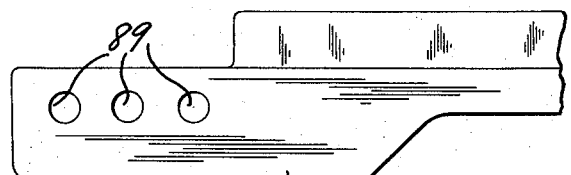
Figure 29 illustrates a saw blade constructed for use in the mechanism shown in Figure 28.
Figure 28A:
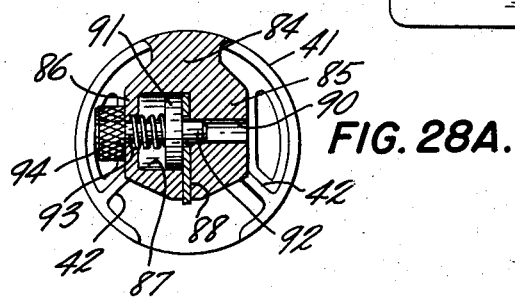
Figure 28A is a transverse section taken on the view line 28A—28A in Figure 28.

Referring to Figures 28, 28A and 29, a further manner of fastening the blade 62 to the coupling piston 34 is illustrated. The forwardly extending section of the piston 34 includes the ribs 41 and struts 42 but is otherwise somewhat modified. Thus, a forwardly extending housing 84 integral with the head 37 includes a plate 85 and a three sided member 86 forming a longitudinally extending rectangular cavity 87 having a slot 88 in the floor thereof. The saw blade 62 is formed with three openings 89 in the end thereof and fits through the slot 88 into the cavity 87, cylindrical channels 90 in the plate 85 being in alignment with the openings 89. A movable plate 91 in the cavity 87 carries three pins 92 which cooperate with the openings 89 and the channels 90. The plate 91 is withdrawn by an arm 93 having a knurled head 94, a spring 95 being mounted on the arm 93 to normally urge the plate 91 into engagement with the blade 62. Thus, the blade 62 may be released by merely pulling on the head 94.

Considering next the manner in which the saw blade 62 cooperates with the blade guide 55, reference is made to Figures 1 and 4 wherein these elements are illustrated in detail. In this preferred embodiment of the invention, the guide 55 is fashioned from outer plates 96 and 97 sandwiched on a core plate 98, the guide 55 being held in assembled relation by any conventional means such as spot welds 99 or rivets (not shown). The outer plates 96 and 97 extend a substantial distance below the core plate 98 to form a slot 100 which receives a reduced width tongue 62b formed on the blade 62. It should be noted that the guide 55 and the blade 62 preferably have the same thickness as shown in Figure 4. It will be evident from Figure 1 that the guide 55 is tapered from the housing 30, where it has its greatest vertical dimension, to its other extremity in order to provide a light yet rigid structure for supporting the blade 62.

Inserted and affixed by welding, brazing or other suitable process between the lower edges of the outer plates 96 and 97 remote from the housing 30 is a key 101. Cooperating with the key 101 is a slot 102 formed in the forward section of the tongue 62b and communicating with the rear end of the slot 102 is an opening 103 cut out of the tongue 62b. It should be noted that the slot 100 in the guide 55 increases in depth toward the front of the guide at 104 to facilitate the insertion of the blade 62 therein.

To insert the blade 62 in the saw, it is aligned with and pressed into the slot 100 in the guide 55 with the opening 103 immediately below the key 101. The rear end of the blade 62 is held somewhat lower than the forward end to permit it to be introduced into the coupling piston 34 below the lugs 46b, 47a and 48a. The increased depth of the slot 100 at the point 104 affords adequate space for this maneuver. After the forward end of the blade 62 has been urged into the slot 100 so that the key 101 is even with the slot 102, the blade 62 is moved rearwardly resulting in the key 101 entering the slot 102 and the rear end thereof entering the piston 34. The locking bar 58 may then be urged upwardly to finally position the blade 62. It will be apparent that the reverse procedure must be followed to remove the blade 62 from the saw.

In operation, the engine which includes the cylinder 10 and piston 13 is started and rotation of the crankshaft 19 will drive the coupling piston 34 and the saw blade 62. The wheel bearing 59 together with the coupling piston 34 supports the blade at its rear end while the forward end is supported by the key 101 and the slot 102. In cutting, the saw teeth 62a preferably provide a kerf having a greater width than the guide 55 to permit the saw to cut through thick timbers without binding therein.

It will be apparent that the guide 55 permits the use of an extremely light weight blade 62, a factor of great importance since it minimizes dynamic forces which tend to be great in a high speed reciprocating saw. In addition, the reduced area of the reciprocating blade 62 in contact with the sides of the kerf reduces friction and improves cutting efficiency.

Another important advantage of the invention resides in the fact that the stationary guide 55 serves to provide a solid support for the blade 62 making it possible to apply heavy pressure in cutting without the transmission of this force to the coupling at the rear end of the blade 62. Of course, this force against a non-guided blade is multiplied by the leverage of the blade and results in a high stress concentration at the coupling point.

In order to provide for satisfactory cutting action, the dynamic balance of the moving portions of the saw must be carefully controlled. Thus, the reactive forces resulting from the reciprocating movement of the firing piston 13 and its associated elements and the coupling piston 34 and its associated elements including the blade 62 must be considered. Further, the reactive force arising from the blade 62 due to the cutting action of the teeth 62a is in the same direction as the reactive force of the coupling piston 34 and must, therefore, be taken into account in dynamically balancing the saw.

It will be appreciated that to attain relatively smooth operation of the power saw, the combined weight of the saw blade 62 and the coupling piston 34 must be offset by a firing piston having an approximately equal weight. However, increased smoothness of operation and efficiency in sawing can be obtained by the carefully controlled unbalance of these components. Thus, in the present embodiment of the invention, the weight of the firing piston 13 and its associated elements is purposely made slightly greater than the combined weight of the saw blade 62 and the coupling piston 34 and its associated elements. As a result of this unbalance, as the firing piston commences its power stroke the reactive force arising from the cutting action of the blade 62 is added to the reactive force of the accelerating blade 62 and the coupling piston 34. However, due to the extra weight of the firing piston 13, its reactive dynamic force will be greater than the reactive dynamic force of the coupling piston 34 and blade 62 and will thus tend to offset the reactive force generated by the cutting action of the blade 62. Accordingly, the power saw will be better balanced when cutting to minimize vibration, an important factor in portable power saws.

In addition, the actual cutting operation is greatly aided by employing the heavier firing piston 13. Thus, since the center lines of the piston and the crankshaft 19 are well below the center of gravity of the entire power saw, the additional reactive dynamic force of the heavier firing piston 13 will, at the beginning of the power stroke, tend to rotate the entire power saw around its center of gravity so as to urge the saw blade 62 into the wood. Conversely, at the beginning of the compression stroke when the blade 62 is being returned to its outermost position, these same forces will tend to rotate the saw so as to urge the blade 62 away from the wood. This action facilitates the passage of the teeth 62a over the sawdust in the kerf resulting in the efficient movement of such sawdust in the inward direction out of the kerf. In addition, the upward motion of the blade 62 minimizes the power necessary to return the blade 62 to its outer position.

It will be understood that the additional weight of the firing piston 13 provides an unbalance when the blade 62 cuts on its inward stroke. This type of cut is preferred since it places the blade 62 in tension and is also easier for an operator to control. However, in certain instances it is desirable to have the blade 62 cut on its outward stroke. In this case, the weight of the coupling piston 34 and the blade 62 may slightly exceed that of the firing piston to urge the teeth 62a into the kerf as the cutting stroke is initiated.

In a twin cylinder opposed stroke reciprocating engine such as employed in the present invention, unbalanced couples are generated by the oppositely moving connecting rods 16 and 26. These couples result from the reactive forces acting about the crankshaft 19 arising from the acceleration and deceleration of the connecting rods in the vertical plane. More specifically, if the crankshaft 19 is rotated in a conventional clockwise direction (viewing the crankshaft 19 from the flywheel), the effect of the connecting rod couples will be to urge the blade 62 upwardly during the firing stroke and downwardly during the compression stroke serving to prevent effective cutting by the saw. Accordingly, the engine used in the present invention has been designed to operate in a counterclockwise direction (looking from the flywheel) to utilize this connecting rod couple to improve the cutting action of the saw.

If it is assumed that the engine is firing, the connecting rod 16 will be decelerated in a direction normal to the movement of the firing piston 13 while the connecting rod 26 will also be decelerated in a direction normal to such movement. The reactive forces arising out of the deceleration of the connecting rod 16 will urge the firing piston 13 upwardly and the crank 17 upwardly. At the same time, the reactive force arising from the deceleration of the connecting rod 26 will urge the coupling piston 34 downwardly and the crank 25 downwardly (assuming the saw is horizontal). It will be apparent that the reactive forces at the crankshaft 19 will balance while the remaining forces on the pistons 13 and 34 will form a couple urging the entire saw to rotate in a direction to cause the blade 62 to bite into the kerf.

It will be understood that when the connecting rods 16 and 26 have passed their vertical positions and started accelerating during the firing stroke, the reactive forces arising from such acceleration will act in the same manner as the reactive forces arising from the deceleration of the rods 16 and 26.

Conversely, during the compression stroke when the blade 62 is being returned to its outer position, the reactive forces generated by the deceleration of the rods 16 and 26 will form a couple rotating the saw in the other direction so that the blade 62 will be urged from the bottom of the kerf to bypass the sawdust therein and facilitate the return movement.

It will be understood that the counterclockwise rotation of the engine is employed in the present embodiment of the invention to provide for effective cutting on the inward stroke of the blade 62. Obviously, if the blade 62 cut on its outward stroke, the direction of rotation of the engine would be reversed in order to employ the connecting rod couples as described above.

It is evident that in the present reciprocating saw, the driving power required is dependent on the width of the kerf and therefore on the thickness of the blade 62 employed. Accordingly, rapid cutting utilizing a low horsepower engine requires the use of a thin blade 62. However, it is apparent that lateral vibration of the blade 62 will become progressively more serious as the blade becomes thinner and less rigid. The stationary guide 55 employed in the present invention reduces such vibration by controlling the lateral movement of the saw blade. However, the rigidity of the guide is somewhat limited since it cannot be thicker than the kerf cut by the blade. Accordingly, any lateral vibration present in the machine will be magnified to some extent in lateral vibration of the blade and guide. Such vibration becomes excessive at certain natural resonant frequencies which are invariably present at one or more points within the operating speed range of a reciprocating power saw constructed in accordance with the present invention.

It should be mentioned that the inability to control the lateral vibration of the blade in reciprocating power saws has been a principal factor in the failure of previous efforts to develop an easily portable internal combustion engine powered reciprocating saw.

More specifically, it is evident from Figure 1A that a lateral couple exists in any twin cylinder opposed stroke engine since it is not possible for the pistons and connecting rods to be directly opposite each other. The magnitude of this couple is proportional to the weight of the reciprocating elements and to the lateral distance between the centers of gravity of the two oppositely moving pistons. It is apparent that this lateral couple arising from the displaced pistons must be precisely balanced in the plane of movement of the blade 62 if lateral vibration is to be minimized.

In order to balance this lateral couple, a rotating couple that is oppositely directed is provided by suitably weighting the crankshaft 19. Thus, the eccentrically mounted weights 27 and 28 are provided on the crankshaft 19 opposite to the connecting rod 26 and the crank 17 is lightened at 18. A correspondingly effective weight 19b is added to unbalance the flywheel 19a so that the weights 27 and 28 and 19b provide, when rotating, a couple precisely balancing the reciprocating couple in the plane of movement of the saw blade 62. It will be understood that instead of unbalancing the flywheel 19a, an additional weight may be provided on the crankshaft 19 oppositely disposed and laterally removed from weights 27 and 28 to accomplish the same result.

Referring to Figures 5 to 7, inclusive, a modified guide and blade assembly in accordance with the invention is illustrated. In this embodiment of the invention, a blade guide 105, generally similar to the guide 55, is formed by outer plates 106 and 107 sandwiched on core plates 108 and 109. The core plates 109 are spaced vertically from the core plate 108 to form a longitudinal oil channel 110 while the core plates 109 are horizontally displaced to form vertical oil channels 111 which join the channels 110 to the upper edge of the saw blade in the guide 105.

A key 112 may be formed by shearing narrow longitudinal pieces 113 and 114 from the lower edges of the plates 107 and 108, respectively, and welding these pieces together as shown in Figures 6 and 7. Alternatively, a key 115 may be provided by dimpling inwardly narrow portions 116 and 117 of the lower edges of the plates 107 and 108, as illustrated in Figures 8 and 9.

The saw blade in the guide 105 may be identical to the blade 62 (Figure 1) or it may be a modified type blade 118 as shown in Figure 5. Thus, notches 75 to 77 are provided in the rear of the blade 118 to engage the coupling piston 34, teeth 118a are formed thereon and a tongue 118b forms the upper portion thereof. Cut inwardly from the forward end of the blade 118 in the tongue 118b is a slot 119. As may be clearly seen in Figure 5, the slot 119 cooperates with the key 112 to support the forward end of the reciprocating blade 118. Also cut out of the tongue 118b are elongated openings 119a which serve to lighten the blade 118 and reduce the friction between the guide plates 106, 107 and the blade tongue 118b.

In regard to lubrication between the blade and guide, it is not necessary to provide a source therefor in all instances. Thus, under the conditions of high speed reciprocating motion, the burnishing action of the tempered steel of the blade tongue against the guide plates provides a low friction contact therebetween. However, it is desirable under certain circumstances to coat the portions of the guiding slot 100 bearing against the blade 62 with a material having a low coefficient of friction when in contact with steel. For example, a thin silver plate reduces the friction due to the contact of the tongue 62b with the guide 55.

Returning to Figure 5, the guide 105 is provided with oil channels 110 and 111 which may be fed from an oil reservoir (not shown) or from a connection through a check valve (not shown) to the crankcase of the engine on the saw. Thus, since the crankcase of a two-cycle engine is lubricated through a mixture of air, oil and gasoline, the pulsating pressurization of the crankcase may be utilized to provide a source of force feed lubrication through the channels 110 and 111.

Instead of providing such oil channels, the guide core plate 108 may have its lower edge scalloped to provide recesses which may carry a porous material, such as felt, saturated with a lubricant. The tongue 118b of the blade 118 will effectively spread such lubrication in the guide. Alternatively, the recesses may be loaded with grease without a porous material. While the saw is cutting, there is a tendency for the sawdust to work its way into the recesses and it will absorb the grease therein. It will also be apparent that the blade 62 (Figure 1) may be greased before insertion into the guide 55.

A further embodiment of the invention is shown in Figures 10 to 12, inclusive, in which a modified blade guide 120 supports a modified saw blade 121. The guide 120 is similar to the guide 55 and comprises a laminated sandwich formed by a pair of outer plates 122 and 123 sandwiched on a core plate 124. However, in this modification of the invention, the keying means is found on the blade 121, similar to the blade 62 in other respects, such keying means taking the form of a pair of longitudinal extending lugs 126 and 127 welded or otherwise attached to the forward portion thereof on both sides of a tongue 121b and fitting into slots 128 and 129 formed in the plates 122 and 123, respectively.

In order to facilitate insertion and removal of the blade 121 into the guide 120, the lugs 126 and 127 are tapered upwardly as well as forwardly and rearwardly into the tongue 121b. Thus, the blade 121 is inserted into the guide 120 by forcing it upwardly between the plates 122 and 123, the tapered portions of the lugs 126 and 127 spreading the resilient plates 122 and 123 to permit the lugs to snap into the slots 128 and 129. In removing the blade 11 from the guide 107, it must be forced either forwardly or rearwardly so that the portions of the lugs 126 and 127 tapering forwardly or reversely will engage the edges of the slots 128 and 129 to spread the plates 122 and 123 permitting the blade 121 to be removed therefrom.

Referring next to Figures 13 to 15, inclusive, a further modified structure for keying a saw blade to a blade guide is illustrated. In this form of the invention, a laminated guide 130 formed by outer plates 131 and 132 and a core plate 133 is adapted to receive a saw blade 134. A plurality of longitudinal pieces 135 are sheared from the lower edge of the plates 131 and 132 and bent in an arc to extend to slots 136 in the opposite plate from which they are punched. As clearly shown in Figure 15, each of the pieces 135 is bevelled downwardly in order to permit a tongue 134b of the blade 134 to engage and push aside the pieces 135 to permit it to be inserted into the guide 130. The pieces 135 will be received by slots 137 cut out of the tongue 134b to secure the reciprocating blade 134 in the guide 130. To remove the blade 134 from the guide 130, it may be pushed forwardly until the rear edges of the slots 137 engage and push aside the pieces 135 and the blade 134 may then be pulled downwardly out of the guide 130.

It will be understood that the guide and blade assembly described in connection with Figures 13 to 15, inclusive, may employ a single bent piece 135 and slot 136. Furthermore, it will be apparent that in any of the foregoing modifications of the guide and blade, a plurality of keying arrangements, as illustrated in Figures 13 to 15, may be employed instead of the single one shown.

Referring next to Figures 16 to 18, inclusive, a further type of blade guide and saw blade assembly is illustrated. In this embodiment of the invention, a laminated guide 138 formed by a pair of outer plates 139 and 140 and a core plate 141, is adapted to receive the tongue 142b of a blade 142. In this instance, the tongue 142b is scalloped at 143 in order to lighten the blade 142 and reduce its area of contact with the guide 125.

A resilient tab 144 is formed by making two oblique cuts 145 and 146 in the plate 139. The tab 144 carries a key 147 welded or otherwise affixed to the lower edge thereof, the key 147 being tapered both downwardly, and rearwardly as clearly shown in Figures 17 and 18. The tongue 142b has a longitudinally extending slot 148 cut therein which receives the key 147 in the normal operation of the saw.

To insert the blade 142 into the guide 138, the tongue 142b is forced against the key 147 which flexes the tab 144 outwardly until the key 147 snaps into the slot 148. In removing the blade 142 from the guide 138, it is urged forwardly so that the rear of the slot 148 engages the key 147 to again flex the tab 144 outwardly.

The foregoing blade guide and saw blade assemblies employ a blade receiving slot in the guide and various keying arrangements for retaining the blade in the guide while permitting high speed reciprocating action of the blade. Obviously, features employed in each of the embodiments described may be employed, where applicable, in the other embodiments of the invention.

Turning to a further blade guide and saw blade arrangement with particular reference to Figures 19 to 21, inclusive, a blade guide 149 is formed from a single plate preferably having substantially the same configuration as the guide 55. Extending downwardly from the center of the lower edge of the relatively thick tapered upper portion is a thin guiding plate 150 that may be formed therefrom by milling, for example. Alternatively, the guide 149 may be formed by laminating three pieces together, the core piece extending downwardly from between the two outer pieces shaping the upper portion of the guide 149. An elongated slot 151 is cut out of the guiding plate 150 preferably at its forward end.

A straddle blade 152 is provided with a plurality of staggered tongues 153 extending upwardly from the outer edges thereof as shown in Figures 19 to 21. Preferably, the tongues are formed in a trapezoid shape in order to force sawdust upwardly as the blade 152 reciprocates. In addition, by employing a plurality of tongues rather than a closed slot in the blade 152, packing of sawdust therein is greatly inhibited.

Welded or otherwise affixed to the forward one of the tongues 153 is a key 154 bevelled upwardly and rearwardly to permit insertion and removal of the blade 152 with respect to the guide 149. Thus, the blade 152 may be forced upwardly against the guiding plate 150 which will engage the key 154 and cause the tongue 153 to flex outwardly and permit it to snap into the slot 151. It will be seen that this arrangement will permit reciprocation of the blade 152. In addition, the blade 152 may be easily removed by merely sliding it rearwardly to again flex the tongue 153.

Figures 22 and 23 illustrate two modified methods of forming a key on one of the tongues 153. The method illustrated in Figure 22 comprises bending the upper end of the tongue 153 back on itself to form a key 155 while the method illustrated in Figure 23 constitutes bending the upper end of the tongue 153 at a right angle to form a key 156.

A modified form of straddle blade and guide is shown in Figures 24 and 25. In this embodiment, a guide 157 having substantially the same configuration as the guide 149 but being formed from a plate of uniform thickness has an open ended longitudinal slot 158 cut out of its forward end. A laminated saw blade 159 is constructed from a pair of outer plates 160 and 161, carrying teeth 160a and 161a, respectively, on the lower edges thereof and sandwiched on a core plate 162 carrying teeth 162a. The three plates may be flush riveted together by rivets 163, for example. As clearly illustrated in Figure 24, the outer plates 160 and 161 are provided with upwardly extending tongues 164 and 165, respectively, which straddle the guide 157. Obviously, these tongues may have the same configuration as the tongues 153 illustrated in Figure 19. Joining the upper edges of a pair of the tongues 164 and 165 is a key 166 welded therebetween and adapted to ride in the slot 158 when the blade 159 is assembled with the guide 157.

Certain important advantages are obtained by employing the straddle blade construction. Thus, packing of sawdust between the blade guide and the saw blade is practically eliminated. Further, since the guide may be so much thinner than the kerf cut by the saw teeth as shown in Figure 25, pinching of the guide 157 between the sides of the kerf is minimized. Further, the thin guide 157 permits the sawdust to move past it to reduce the amount of sawdust that must be discharged at either end of the cut. This greatly increases the effectiveness of the cutting.

It will be obvious that the types of straddle blades illustrated in Figures 19 to 24, inclusive, may be provided with the various types of keys described in connection with Figures 1 to 18, inclusive, this being a mere transposition of parts. Furthermore, it will be evident that certain of the blade guides may be used with appropriate saw blades shown in the various modifications of the invention.

It will be understood that the above-described embodiments of the invention are illustrative only and modifications thereof will occur to those skilled in the art. Therefore, the invention is not to be limited to the specific apparatus disclosed herein but is to be defined by the appended claims.

I claim:

1. In a power saw driven by an internal combustion engine, the combination of a crankshaft including a pair of angularly related cranks mounted in a crankcase, driving piston means coupled to one of the cranks, coupling piston means coupled to the other of the cranks and moving oppositely to the driving piston means, a saw blade secured to the coupling piston means, the weight of the driving piston means being greater than the weight of the coupling piston means including the saw blade to at least partially offset the reactive force due to the cutting action of the blade.

2. In a power saw driven by an internal combustion engine, the combination of a crankshaft including a pair of oppositely disposed cranks mounted in a crankcase, a first connecting rod journaled on one of the cranks and connected to a driving piston moving along one axis in the engine, a coupling piston moving oppositely to the driving piston along another axis in the same plane as the driving piston axis and displaced therefrom, a second connecting rod journaled on the other of the cranks and connected to the coupling piston, a saw blade secured to the coupling piston, and weight means on the crankshaft to provide when rotated a rotating couple oppositely directed to the lateral couple arising from the reciprocation of the driving piston and the coupling piston on the different axes in the same plane.

3. A reciprocating single blade power saw comprising an internal combustion engine having a crankshaft including a pair of oppositely disposed cranks mounted in a crankcase, driving piston means coupled to one of the cranks, coupling piston means coupled to the other crank and moving oppositely to the driving piston means, a blade guide extending horizontally from a position adjacent to the coupling piston means, a horizontally extending vertically cutting saw blade slidably carried by the guide, retaining means holding the blade and the guide in their operative relation, means securing the blade to the coupling piston means, the weight of the driving piston means being greater than the weight of the coupling piston means including the saw blade to at least partially offset the reactive force due to the cutting action of the blade in a kerf being cut.

4. A reciprocating single blade power saw comprising an internal combustion engine having a crankshaft including a pair of oppositely disposed cranks mounted in a crankcase, a driving piston moving along one axis coupled to one of the cranks, a coupling piston coupled to the other crank and moving oppositely to the driving piston along another axis in the same plane as the driving piston axis and displaced therefrom, a blade guide extending horizontally from a position adjacent to the coupling piston, a horizontally extending vertically cutting saw blade slidably carried by the guide, retaining means holding the blade and the guide in their operative relation, means securing the blade to the coupling piston, and weight means on the crankshaft to provide when rotated a rotating couple oppositely directed to the lateral couple arising from the reciprocation of the driving piston and the coupling piston on the different axes in the same plane.

5. A reciprocating single blade power saw comprising an internal combustion engine having a crankshaft including a pair of oppositely disposed cranks mounted in a crankcase, a driving piston moving along one axis coupled to one of the cranks, a coupling piston coupled to the other crank and moving oppositely to the driving piston along another axis in the same plane as the driving piston axis and displaced therefrom, a blade guide extending horizontally from a position adjacent to the coupling piston, a horizontally extending vertically cutting saw blade slidably carried by the guide, retaining means holding the blade and the guide in their operative relation, means securing the blade to the coupling piston, the weight of the driving piston being greater than the weight of the coupling piston including the blade to provide a reactive force at the beginning of the cutting stroke of the blade tending to rotate the power saw about its center of gravity to urge the blade into a kerf being cut, said unbalanced driving piston and coupling piston including the blade providing at the beginning of the return stroke of the blade a reactive force tending to rotate the power saw about its center of gravity to urge the blade out of the kerf, and weight means on the crankshaft to provide when rotated a rotating couple oppositely directed to the lateral couple arising from the reciprocation of the driving piston and the coupling piston on the different axes in the same plane.

6. A reciprocating single blade power saw comprising an internal combustion engine having a crankshaft including a pair of oppositely disposed cranks mounted in a crankcase, a first connecting rod journaled on one of the cranks connected to a driving piston moving along one axis in the engine, a coupling piston slidably positioned in a cylinder communicating with a crankcase moving oppositely to the driving piston along another axis in the same plane as the driving piston and displaced therefrom, a second connecting rod journaled on the other crank and connected to the coupling piston, a blade guide extending horizontally from a position adjacent to the coupling piston cylinder, a horizontally extending vertically cutting saw blade slidably carried by the guide, retaining means holding the blade and the guide in their operative relation, means securing the blade to the coupling piston, means including the internal combustion engine and the driving piston to rotate the crankshaft in a direction to cause the reactive forces normal to the movement of the coupling piston arising out of the motion of the connecting rods to urge the saw blade into a kerf being cut during its cutting stroke and out of the kerf during its return stroke, said reactive forces providing couples around the crankshaft, and weight means on the crankshaft to provide when rotated a rotating couple oppositely directed to the lateral couple arising from the reciprocation of the driving piston and the coupling piston on the different axes in the same plane.

7. A reciprocating single blade power saw comprising an internal combustion engine having a crankshaft including a pair of oppositely disposed cranks mounted in a crankcase, a first connecting rod journaled on one of the cranks connected to a driving piston moving along one axis in the engine, a coupling piston slidably positioned in a cylinder communicating with a crankcase moving oppositely to the driving piston along another axis in the same plane and displaced therefrom, a second connecting rod journaled on the other crank and connected to the coupling piston, a blade guide extending horizontally from a position adjacent to the coupling piston cylinder, a horizontally extending vertically cutting saw blade slidably carried by the guide, retaining means holding the blade and the guide in their operative relation, means securing the blade to the coupling piston, and at least two weights eccentrically mounted on the crankshaft to provide when rotated a rotating couple oppositely directed to the lateral couple arising from the reciprocation of the driving piston and the coupling piston on the different axes in the same plane.

References Cited in the file of this patent

UNITED STATES PATENTS

| | | |
|---|---|---|
| 45,980 | Disston | Jan. 24, 1865 |
| 139,426 | Scholfield | May 27, 1873 |
| 206,908 | True | Aug. 13, 1878 |
| 412,176 | Griffin | Oct. 1, 1889 |
| 869,659 | Schubert | Oct. 29, 1907 |
| 893,897 | Bens | July 21, 1908 |
| 1,537,980 | Asselin | May 19, 1925 |
| 1,539,470 | Deskins et al. | May 26, 1925 |
| 1,557,973 | Bowden | Oct. 20, 1925 |
| 1,564,448 | Roget | Dec. 8, 1925 |
| 1,838,125 | Wirtz | Dec. 29, 1931 |
| 2,139,147 | Blum | Dec. 6, 1938 |
| 2,506,736 | Oschwald | May 9, 1950 |
| 2,535,491 | Felton | Dec. 26, 1950 |
| 2,547,922 | Bechtold | Apr. 10, 1951 |
| 2,573,573 | Jenkins | Oct. 30, 1951 |
| 2,619,132 | Pierce | Nov. 25, 1952 |
| 2,639,737 | Forsberg | May 26, 1953 |
| 2,695,641 | Behr | Nov. 30, 1954 |
| 2,751,940 | Miller | June 26, 1956 |

FOREIGN PATENTS

| | | |
|---|---|---|
| 77,252 | Norway | Aug. 7, 1950 |
| 91,740 | Germany | May 11, 1897 |
| 233,251 | Great Britain | May 7, 1925 |